Sept. 5, 1950 W. W. HALLINAN 2,521,060
FILTER
Filed April 19, 1946 5 Sheets-Sheet 2

Inventor
William W. Hallinan
by Robert H. Wendt
Atty

Inventor:
William W. Hallinan
By Robert H. Wendt
Atty

Inventor
William W. Hallinan
By Robert H. Wendt
Atty.

Patented Sept. 5, 1950

2,521,060

UNITED STATES PATENT OFFICE 2,521,060

FILTER

William W. Hallinan, Racine, Wis.

Application April 19, 1946, Serial No. 663,360

7 Claims. (Cl. 210—183)

The present invention relates to filters, and is particularly concerned with filters of the type which are adapted to be used for filtering oil or other liquids, gas or air.

One of the objects of the invention is the provision of an improved filter of the disk type in which the filtering elements are adapted to be replaced with a minimum amount of labor, and in which a greater filtering area may be provided, while still making the device more compact than the devices of the prior art.

Another object of the invention is the provision of an improved filter of the class described which is adapted to effect an efficient filtering of liquid or air as long as the filter element is clean, but which is adapted to permit the safety by-pass of the material to be filtered whenever the filter element becomes clogged sufficiently. This is of particular importance in connection with automobile engines, where the clogging of the filter element would ordinarily shut off the supply of oil completely to the bearings to which the conduits are connected beyond the filter element, while the pressure gauge would continue to show pressure and would be taken as an indication that oil is being supplied to the bearing. This cannot happen with the present filter, because, under such conditions, it will by-pass the liquid in an unfiltered condition if the filter element is clogged.

Another object of the invention is the provision of an improved filter, the parts of which may be stamped or punched out of sheet material by means of a press, except, for example, the cover element which contains the inlet and outlet which is preferably made of cast metal or molded material.

Another object of the invention is the provision of an improved filter structure by means of which the density of the filter elements may be adjusted, so that a loose adjustment may be provided which will allow small particles of foreign substances to pass if they are not liable to cause damage, and which is still adapted to filter out the larger particles; or which may be adjusted so as to increase the density of the filter element so that even the small particles of foreign substances will be caught in the filter.

Another object of the invention is the provision of a plurality of improved modifications which have filter unit assemblies which can be sold as a unit for replacement, and which can be very readily removed as a unit and replaced as a unit in a filter installation.

Another object is the provision of improved filter structures which are adapted to be cleaned quickly and easily and provided with new filter elements, and in which the filter elements are made of material easily packed and carried by service men, or in which a temporary repair job can be made by cutting out pads from any sheet material, such as cotton or wool felt, or cotton or wool cloth.

Another object of the invention is the provision of simplified structures for holding the filter pads with their through apertures in alignment in a stack so that it is not necessary to utilize intermediate pressure plates provided with grooves connecting the apertures in successive packs.

Another object of the invention is the provision of improved filter element units which can be used by merely screwing them into holes in the side wall of a conduit so that when the conduit is subjected to suction the various filter elements may merely be immersed in the liquid to be filtered, or they may be provided with a housing for containing the liquid to be filtered.

A further object of the invention is the provision of an improved filter unit which is built up of one pad of the fibrous material with the through conduits and bores which have the filtering surface pre-formed in this pad at the time it is made so that it is unnecessary to assemble a stack of pads to make the filter assembly, but two pressure plates and one elongated pad constitute the complete filter unit.

Other objects and advantages of the invention will be apparent from the following description and the accompanying drawings, in which similar characters of reference indicate similar parts throughout the several views.

Referring to the drawings, of which there are five sheets.

Referring to Figs. 1 to 8, these are views of one form of the invention which is particularly adapted to be used as the oil filter for an internal combustion engine on an automobile. The filter assembly preferably includes a housing 40 which may be made of cast metal or molded out of a phenolic compound, a filter unit 41, and a spring 42 and cover 43 for closing the housing and holding the filter unit in place.

Figures 1, 2, 3, 4, 5, 6, 7, 8, 9:
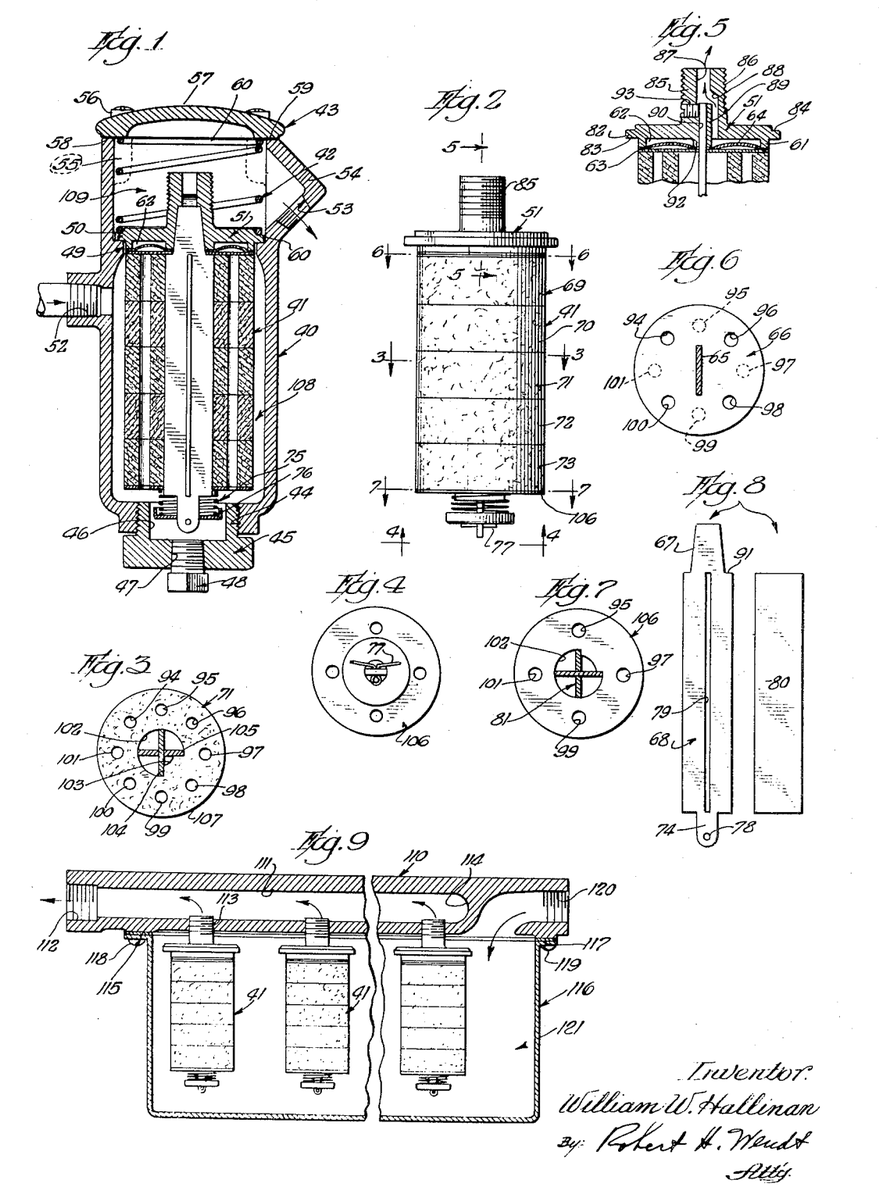
Fig. 1 is an axial sectional view taken through a filter embodying the invention, showing the housing and filter unit in cross-section.
Fig. 2 is a side elevational view of the renewable filter unit.
Fig. 3 is a sectional view taken through the filter unit on the plane of the line 3—3 of Fig. 2, looking in the direction of the arrows.
Fig. 4 is a bottom end plan view of the filter unit taken on the plane of the line 4—4 of Fig. 2, looking in the direction of the arrows.
Fig. 5 is a fragmentary sectional view taken on a plane at right angles to the plane of Fig. 1, that is, the plane 5—5 on Fig. 2, looking in the direction of the arrows, showing the outlet conduit at the top of the filter unit.
Fig. 6 is a sectional view through the filter unit taken on the plane of the line 6—6 of Fig. 2, looking in the direction of the arrows, below the filter cloth but above the top plate.
Fig. 7 is a sectional view through the filter unit taken on the plane of the line 7—7 of Fig. 2, looking in the direction of the arrows, showing the structure of the bottom plate and its cooperation with the core.
Fig. 8 comprises an exploded view of the two parts of the core, each being shown in elevation.
Fig. 9 is a sectional view taken on the axis of the inlet and outlet conduits of a conduit and housing arrangement for a filter for embodying a multiplicity of filter units.

The housing may consist of a cylindrical member which is preferably provided with an enlarged threaded opening 44 at its lower end to be used as a clean-out opening. This opening may be closed by a threaded cap 45 of substantially cylindrical form, threaded into the bore 44 and having a recess 46 for housing the lower end of the filter unit 41.

Cap 45 preferably has a threaded bore 47 closed by a plug 48. The cap 45 is adapted to be removed with the sediment located in the recess 46. In other installations the plug 48 may be replaced by a pipe and a suitable valve so that the sediment may be washed out through the opening 47 without the necessity for removing the cap 45.

The housing 40 is preferably provided with an inwardly extending rib 49 spaced from its upper end and provided with an annular shoulder 50 for supporting the filter unit 41 by means of its supporting body 51. At a point below the annular shoulder 50 housing 40 is provided with an inlet conduit 52, and at some point above the cover 51 the housing is provided with an outlet bore 53.

In some installations, 53 may be used as the inlet and 52 may be used as the outlet. In order to permit the outlet pipe 53 to extend downward, the upper part of housing 40 is provided with an angular housing portion 54, the lower wall of which contains the outlet bore 53, in such case the filter cloth or screen 64 should be omitted.

The wall of the housing 40 may be relatively thin, but it is preferably thickened or provided with inwardly projecting cylindrical lugs 55 at each of four diametrically opposite points adjacent its top opening. These lugs 55 provide sufficient body for threaded bores for receiving the screw bolts 56 which pass through the cover 43 and are threaded into the bores in lugs 55.

Cover 43 may consist of a circular cast metal member convexly curved on its upper surface 57 and provided with a lower plane surface 58 for engaging the spring and seating against the upper plane end surface 59 of the housing. An annular gasket may be interposed between the surfaces 58 and 59.

The spring 42 comprises a spring which is generally helical, but the end turns 60 are circular in form so as to engage the cover 43 and supporting body 51 of the filter unit. The spring 42 is under an initial compression so that the filter unit is pressed into place; but should the pressure on the filter unit increase unduly, such as would be the case when the filter elements are clogged, this fluid pressure will force the unit upward until the liquid leaks past the rib 49 and is discharged without filtering. This is a by-pass feature which is very valuable in the case of an automobile filter.

Were it not for this feature, the filter might become clogged and prevent oil from being pumped to the bearings; yet the driver would receive an indication of pressure at the oil pressure gauge, which is the usual indication that the bearings are receiving oil. With my filter the bearings will receive oil whether or not the filters are clogged. The amount of by-pass will depend upon the pressure and the relative movement of the unit upward against the spring. Thus a predetermined amount of clogging might result in a partial by-passing of the oil.

Referring to Fig. 2, this is an elevational view of a filter unit, the entirety being indicated by the numeral 41. Such a filter unit may be removed or installed as a unit in the housing 40. By merely removing the cover and the spring the filter unit becomes available for removal.

The supporting element for such a filter unit is shown in elevation in Fig. 2 and in section in Fig. 5. This supporting body is indicated by the numeral 51 and it comprises a substantially circular metal member having a depending annular flange 61 forming a shallow circular recess 62 on the lower side of the supporting body 51.

The plane lower surface of flange 61 serves to engage a filter cloth 64, which may be a disk of shaker cloth or cotton flannel, which is held spanning the discharge recess 62 so as to catch fuzz or parts of the filter elements or pads, such as fibres, which might be loosened by the flow of liquid. The filter cloth 64 assures the filtrate being absolutely clear of such fuzz. A fine metal screen 64 may be used instead of cloth 64.

The filter cloth 64 is without any through apertures, except a slot at the center like the slot 65 which is seen in the top plate 66, Fig. 6, for passing the prong 67 of one of the core members 68, further to be described.

These core members are for the purpose of supporting and aligning the filter pads 69—73. These should be kept in alignment not only to hold them in a stack but to align the apertures in the pads so that they will communicate with each other.

Core member 68 may consist of a strip of metal, such as steel, of generally rectangular shape, having a tapered prong 67 at its upper end and a depending securing flange 74 at its lower end. The lower flange 74 is long enough to project beyond the pack so as to support a spring 75 and cap 76, which are retained in place by means of a cotter pin 77 passing through the aperture 78.

Core member 68 has a longitudinally extending narrow rectangular slot 79 located at its axis and adapted to receive the rectangular core member 80 which is frictionally held in the slot 79 and gives the core a cruciform shape, as seen in Fig. 7. The complete core is indicated by the numeral 81 in Fig. 7.

The supporting body 51 also has an annular flange 82 projecting beyond the depending flange 63 and providing an annular seating surface 83 which may be seated upon the shoulder 50 in the housing 40. The body 51 is also preferably provided with an annular recess 84 on its upper outer corner for seating the lower coil 60 of the spring 42.

The body 51 is also provided with an axially located hub 85 which may be externally threaded at 86 so that it can be employed as shown in Fig. 9. Hub 85 has an axially located outlet bore 87 which is diverted laterally at 88 to retain enough of the core body at its axis and lower end so that the central part 89 of hub 85, may have a rectangular slot 90 for receiving the tang 67 of the core assembly 81. This tang is secured in place with its upper shoulder 91 engaging top plate 66 and holding it against a centrally located lug 92 on the body 51, and it is fastened by means of a set screw 93 in a threaded bore, engaging the tang 67. The conduit 87 communicates with the space 62 above the filter cloth 64.

The filter pads 69—73 may be identical in construction, and each may consist of a substantially cylindrical pad of thick cotton felt. Various other types of felt pads, such as wool felt or other fibres, made to the same shape, may be employed, but in one form of the invention the pads may be made by means of dies which cut out the circular pads and simultaneously punch the necessary holes.

Referring to Fig. 3, it will be seen that in this small type of pad the filter element is provided with a series of circular holes 94—101, and these holes are preferably arranged in a circle and are preferably of the same size.

In addition to the holes 94—101 the pads are provided with a centrally located aperture 102 which is cylindrical over three-fourths of its periphery, with a relatively large radius, and which may also be cylindrical at the portion 103 of the other quarter of its periphery, except that it is formed on a smaller radius.

The important feature about this aperture 102 is that it is provided with a pair of radial surfaces 104, 105 on the lug 103, which engage the oppositely facing surfaces in one of the sectors of the core assembly 81. Thus the core assembly 81 is adapted to prevent rotation of the disks of felt on the core, and the core can hold these disks in a predetermined position so that all of the apertures in the adjacent disks will be in alignment.

In some embodiments of the invention all of the conduits 94—101 might be employed as filtrate return conduits, in which case the top plate 66 would be provided with the same apertures 94—101. In such case all of the external surface of the pads and the internal surface of the bore 102 would be the filtering surfaces. However, it is sufficient to provide every alternate hole in the felt disk as a filtrate return conduit, and the others may be blocked off and thus may have their wall surfaces used as filtering surfaces. Thus the apertures 94, 96, 98 and 100 appear in the top plate 66, while the other apertures 95, 97, 99 and 101 are blocked off and shown in dotted lines in Fig. 6. The same numerals are applied to the apertures in the pads and pressure plates, since these numerals may thus also indicate the conduit which is formed by the apertures in the assembly.

At the opposite end of the pad assembly there is provided another pressure plate 106, shown in Fig. 7, and this plate performs the dual function of distributing the pressure on the pads uniformly, aiding and maintaining their alignment, and blocking off certain of the apertures which are used for filtrate return conduits. Thus, in the bottom plate 106, there are only the apertures 95, 97, 99 and 101.

The shape of the centrally located aperture 102 is substantially the same. The apertures 94—101 are preferably located midway between the outer surface 107 of the pad and the inner surface of the bore 102.

The length of the core assembly 81 is preferably such that it projects beyond the bottom plate 106 when assembled with the pads, as shown in Fig. 2. Thus the lower end of the core assembly may serve as a means for aligning the upper end of the spring 75, which is seated about the core assembly.

Spring 75 comprises a light helical spring which is placed under initial compression when assembled with the cap 76 within which it is seated. Cap 76 has a rectangular slot for passing the lower flange 74 of the core, and the cap is secured on the flange 74 by means of the cotter pin 77.

The circulation of the liquid or gas to be filtered will be apparent from the foregoing description. The liquid, for example, may come in at the inlet 52 and may surround the filter unit 41 in the chamber 108 of the housing 40, but cannot pass into the upper chamber 109 without going through the filter unit 41.

Liquid to be filtered passes up into the central bore 102 by passing through the spring 76 and up into the conduits provided on the four sides of the core 81. Thus the interior of bore 102 becomes a filter surface. Liquid also passes up the apertures 95, 97, 99 and 101, and the liquid is in contact with the external surface 107 of the filter unit.

From all of these surfaces the liquid to be filtered passes through the felt into the apertures 94, 96, 98 and 100, which form longitudinally extending conduits communicating with the chamber 62 underneath the supporting body 51 of the filter unit. In so doing, all of the filtrate must pass through the filter cloth 64 which catches all fuzz and fibres, and thereafter the filtrate passes out of the conduit 87 into upper chamber 109 and out of the outlet 53.

In the event it is necessary to change filter units, the operator may remove the cap 57 and spring 42 and then merely lift the filter unit out and replace it with another one.

If sludge accumulates in the chamber 108 at the bottom it may be removed with the cap 45 which is located to collect the slude. If the filter is so installed as to have a cleaning circuit leading out of the lower port 47, then suitable valves may be opened to flush liquid through the chamber 108 and carry the sludge with the liquid out of pipes attached at 47.

If the filter pads become so clogged that oil cannot pass, the strength of the spring 42 is made such with relation to the projected area of the body 51 that the oil pressure is adapted to lift the entire filter unit 41 in the housing until oil may pass freely past the shoulder 49 through a crack between body 51 and annular shoulder 50.

Figure 28:
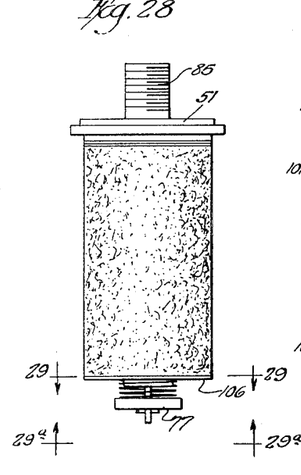
Fig. 28 is a view similar to Fig. 2, showing a modified form of filter unit including a single filter element or pad.
Figure 29:
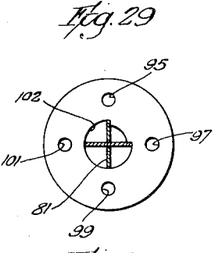
Fig. 29 is a sectional view taken on the plane of the line 29—29 of Fig. 28, showing a view like Fig. 7 of this modification.
Figure 29A:
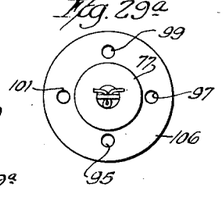
Fig. 29a is a plan view of the bottom plate.

In some embodiments of the invention the filter unit may be made with one single thick pad, of cylindrical shape, which is provided with the same apertures 102 and 94—101. Such a unit may be built up by packing the fibres in a cylindrical container having mandrels located where the aperturues are to be in the unit. Thus the complete filter unit would consist of a single pad, with an upper and lower pressure plate instead of a plurality of pads, and this embodiment is illustrated in Fig. 28. In such case no provision need be made for alignment, such as the shoulders 104, 105, and the bore 102 may be circular.

Referring now to Fig. 9, this is an illustration of the mode of use of the filter unit of Fig. 2 by attaching its threaded hub to a conduit 110. Conduit 110 may consist of a pipe having an internal bore 111 and a threaded portion 112, and its wall may be provided with a multiplicity of threaded bores 113 into which hubs 85 may be threaded. The end of the pipe 110 is closed at 114 so that such a pipe may be immersed in liquid in any container and used as a filter to take off only the filtrate.

A further improvement may consist in providing the pipe 110 with a plane seating surface 115 against which there is secured a metal housing 116 of sufficient size to embrace and enclose all of the filter units 41. A gasket 117 is interposed between housing 116 and pipe 110, and the housing may be secured in place by screw bolts 118 passing through the attaching flange 119 and threaded into the pipe wall. The member 110 may also be provided with a threaded inlet 120 which communicates with the chamber 121 inside the housing 116.

It will thus be observed that the filter units 41 are adapted to be used in many different ways.

Referring now to Figs. 10 to 14, these are views showing a modification having a different mode of support of the pads, and a different means for assuring the alignment of their apertures. In this embodiment of the invention the supporting pad may consist of a cast metal or molded member 122 of substantially circular shape, but provided with radially projecting lugs 123, 124 having the inlet conduit 125 and outlet conduit 126. The lower side of the body 122 is formed with an annular groove 127 which communicates with the outlet conduit 126.

Figures 10, 11, 12:
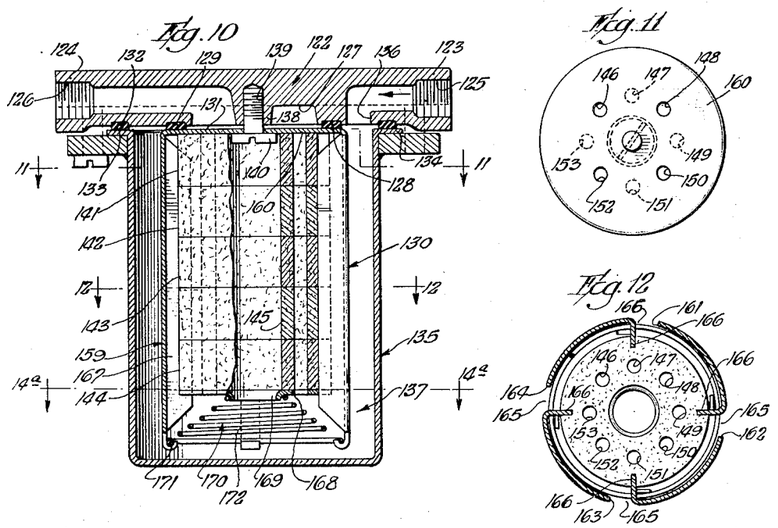
Fig. 10 is a view similar to Fig. 1, of a modified form of filter assembly in which the filter pack is supported by a different type of supporting element which leaves the center aperture open to have its wall surface used as a filtering surface, the section being taken on the axis of the filter.
Fig. 11 is a top plan view of the filter unit removed from its housing, taken on the plane of the line 11—11 of Fig. 10, looking in the direction of the arrows.
Fig. 12 is a sectional view taken on the plane of the line 12—12 of Fig. 10, looking in the direction of the arrows.

The lower side of body 122 is also formed with an annular seating surface 128 surrounding the conduit 127 for engaging a gasket 129 and engaging the filter unit 130 which has an upper flat surface 131.

The lower side of body 122 is also provided with an annular groove 132 having a plane surface for engaging the gasket 133 which is interposed between the attachment flange 134 of the housing 135 and the lower side of body 122. Seating surface 132 is located outwardly far enough so that the inlet conduit 125 passes downward at 136 into the chamber 137 of the housing 135.

Figures 13, 14:
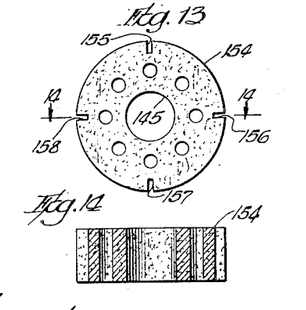
Fig. 13 is a plan view of one of the filter elements or pads.
Fig. 14 is a transverse sectional view taken through one of the filter elements or pads on the plane of the line 14—14 of Fig. 13.

The supporting body 122 may have a centrally located, downwardly projecting lug 138 which has a threaded bore 139 for receiving the screw bolt 140 which secures the filter unit 130 to the cover member 122. The threaded unit, in this case, consists of a multiplicity of the felt pads 141—144, each of which is provided with a centrally located bore 145 and with a series of apertures 146—153, preferably located on the line of a circle midway between the outer surface 154 of the pad and the inner bore 145. The pads are also preferably provided with a plurality of radially inwardly extending slots 155—158. The number of these slots depends upon the size of the unit, as the need for alignment members increases with the size of the unit. The pads in this case are carried by a pad supporting member 159 which may consist of a substantially cylindrical member, the end wall 160 of which has a centrally located aperture for the screw bolt 140.

The pad supporting member 159 may be slit longitudinally at four points, 161—164, and may also be slit circumferentially adjacent the end wall 160 as, for example, at the points 165. Then the adjacent part of the can which forms this member 159 may be bent radially inward, forming the inwardly extending aligning flanges or keys 166 which are adapted to extend into the slots 155—158 of the pads.

The can 159 is preferably substantially larger in diameter than the pads so that there is an annular space 167 between the supporting member 159 and the pads, making the exterior surface of the pads available as a filtering surface.

The upper end 160 of the can 159 may serve as an end pressure plate, which is shown in Fig. 11. Since all of the apertures are not needed to carry the filtrate out of the filter unit, this end 160 is only provided with the apertures 146, 148, 150 and 152. The dotted lines in Fig. 11 show that the other apertures have been blocked off and the walls of these other apertures 147, 149, 151 and 153 may serve as filtering surfaces.

Figure 14A:
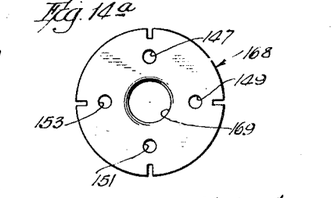
Fig. 14a is a plan view of the bottom plate.

The lower pressure plate preferably consists of a metal member which is formed with the apertures 147, 149, 151, 153, thus permitting those apertures to communicate with the interior of the housing 135 to receive the liquid to be filtered.

The lower pressure plate 168 preferably has a centrally located aperture with a tubular depending flange 169 for seating one end of the spring 170.

The depending walls of the can 159 may be provided with upwardly turned hooks 171 for receiving and seating the other end of the spring 170. These hooks 171 may be formed upon relatively narrow depending portions 172 of the walls of the supporting member 159. The spring 170 is preferably a spiral spring, which assumes a substantially conical form when initially compressed, as shown in Fig. 10. The compression of the spring 170 holds the pads under proper pressure, and, in this case, the pressure is predetermined by the use of a spring of desired characteristics.

The operation of this embodiment of the invention is substantially the same as that described with respect to Fig. 1, the oil entering at the right-hand inlet 125 and passing into the chamber 137 of housing 135. Therefore, it passes upward into the bore 145 and engages the external surface 154 of the pads and into the bores 147, 149, 151 and 153 of the pads. All of these surfaces are adapted to serve as filter surfaces, the liquid passing laterally through the felt pads into the conduits 146, 148, 150 and 152 which communicate with the annular space 127. In this case the gasket 129 may also clamp a sheet of suitable fabric for filtering out the fuzz and other fibres which might appear in the stream.

Referring to Figs. 15 to 19, these are views showing another modified form of filter unit which may be substituted for the filter unit of Fig. 2. In this case the supporting body 51 may be of similar shape, except that its hub 85 is provided with a straight through bore 173 which may be threaded at its lower end to receive the threaded end portion 175 of a rod 176. The lower end of the bore 173 is provided with a plurality of radial slots 177, which permit the liquid to pass by the threaded end 175 of the rod but sufficient of the threaded bore 173 is left at each side of the slots 177 to have threaded engagement with the rod 176.

Figure 15:
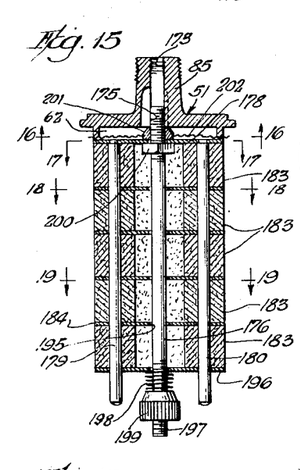
Fig. 15 is a sectional view taken on a plane passing through the axis of another modified form of filter unit which may be employed in the housing of Fig. 1 or that of Fig. 9, and which may be made of a size particularly adaptable for the filter of an automotive internal combustion engine.
Figure 16:
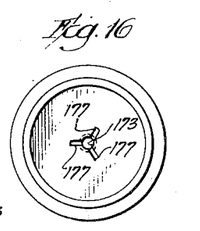
Fig. 16 is a bottom plan view of the cover taken on the plane of the line 16—16 of Fig. 15.

The filter unit in this case comprises a supporting member which has an end plate 178 and a pair of alignment pins 179, 180. The alignment pins are formed with reduced end portions having shoulders seated against the end plate 178, and the reduced portions may be riveted over to secure the pins 179 in the end plate 178.

The pins 179, 180 pass through apertures 181, 182 in a plurality of pads 183 and a plurality of spacer plates 184. In addition to these apertures, the spacer plates and pads are provided with a multiplicity of additional apertures 185—192, arranged in a circle, and with a centrally located bore 193.

Figure 17:
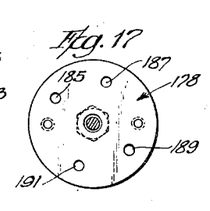
Fig. 17 is a top plan view of the top plate and filter pack assembly taken on the plane of the line 17—17 of Fig. 15, looking in the direction of the arrows.
Figure 18:
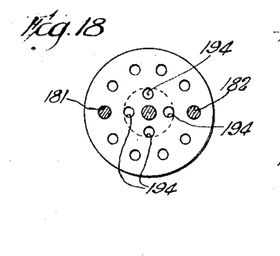
Fig. 18 is a plan view of one of the alignment plates, being a sectional view, taken on the plane of the line 18—18 of Fig. 15, looking in the direction of the arrows.
Figure 19:
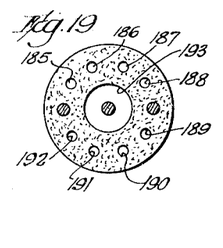
Fig. 19 is a plan view of one of the filter elements or pads, being a sectional view taken on the plane of the line 19—19 of Fig. 15, looking in the direction of the arrows.
Figure 20:
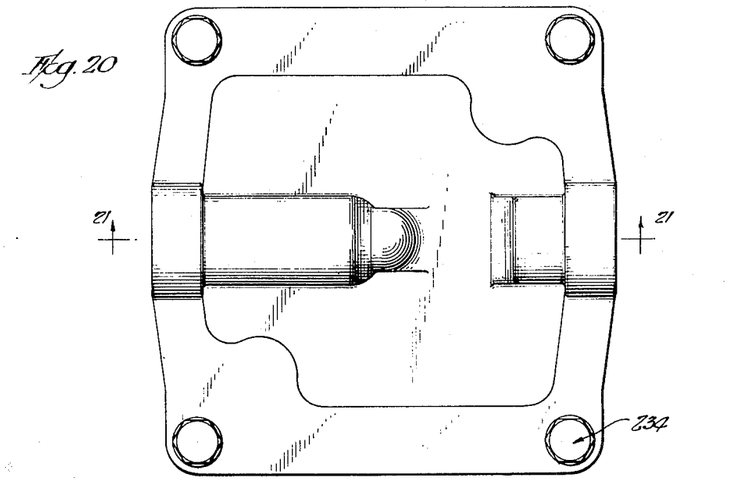
Fig. 20 is a top plan view of another modified form of filter assembly.

The upper plate 178, Fig. 17, is provided with the apertures which have odd numbers, while the spacer plates 184 are provided with all of the apertures, and with additional small apertures 194 surrounding the rod aperture 195 so as to communicate with the large bore 193 in the pads. The lowermost end plate 196 is provided with the even numbered apertures 194 surrounding the rod.

The lower end of the rod 176 is threaded at 197 and carries a relatively fine coil spring 198 and a knurled threaded member 199 for placing a pressure on the pack of filter pads. At its upper end rod 176 carries a lock nut 200 under the top plate 178 and a conical spacer 201 which serves to hold down a fabric and gauze filtering sheet 202 which is located in the upper chamber 62 to filter out fuzz and fibres which might otherwise appear in the filtrate.

In this case the end plates 178 and 196, and the pins 179, 180, form a support on which the spacer plates 184 and filter pads 183 may be mounted as a unit. The pins 179, 180 serve to secure the alignment of the apertures in the pads and spacer plates, and the spacer plates aid in distributing the pressure and assuring a uniform pressure on each pad and also in keeping the assembly in shape.

The present filter unit of Fig. 15 may be mounted in a housing in exactly the same manner as shown in respect to Fig. 1.

Figure 30:
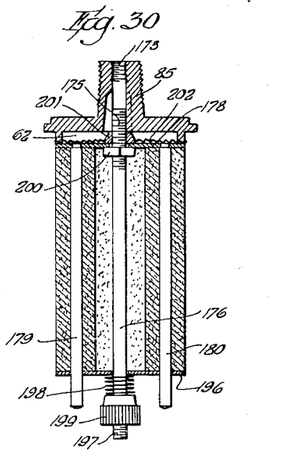
Fig. 30 is a view similar to Fig. 15, of a modification in which a single filter element or pad is employed.

Referring to Fig. 30, this is a modification in which the spacer plates have been eliminated, and all of the pads 183 have been embodied in one single, fibrous, felted assembly which is provided with the same apertures.

Referring now to Figs. 20 to 27, these are views showing another modification, in which the filter surface is increased by providing a unit of rectangular form for places where there is space for a filter of this shape. In this case the upper cover or supporting body 122 is of substantially the same shape as the one described with respect to Fig. 10, having the same outlets, inlets and seating surfaces.

Figure 22:
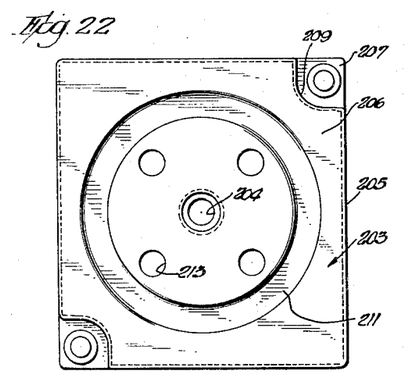
Fig. 22 is a sectional view taken on the plane of the line 22—22 of Fig. 21, showing a top plan view of the filter unit cover.
Figure 23:
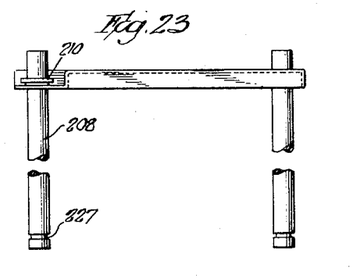
Fig. 23 is a fragmentary elevational view of the filter unit cover and the assembly posts by means of which the pads are held in alignment.
Figure 24:
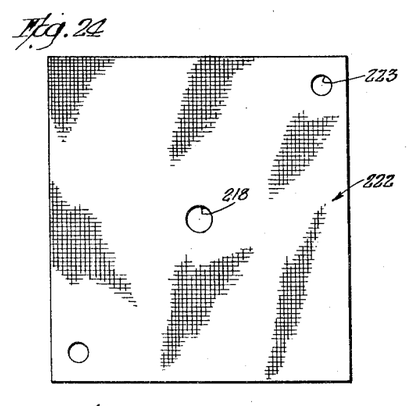
Fig. 24 is a sectional view taken on the plane of the line 24—24 of Fig. 21, looking in the direction of the arrows, showing the filter cloth in plan.

The end pressure plate 203 is shown in plan in Fig. 22. It may comprise a stamped sheet metal member of rectangular form having a central aperture 204 and a depending border flange 205. At two opposite corners the body flange 206 may be pressed downward into the plane of the lower edge of the border flange 295, thus forming a seat 207 for supporting an alignment pin 208. The border flange curves inside the alignment pin 208 at 209. The alignment pins 208 are formed with outwardly pressed annular flanges 210 which engage the upper side of plate 203, to which they may be soldered or otherwise secured in fixed position.

The plate 203 is provided with a stamped annular depression 211 for engaging a gasket 212 carried by the body 122. The apertures 213 provide communication between filtrate conduits in the filter unit 214 and the outlet conduit 127.

Figure 21:
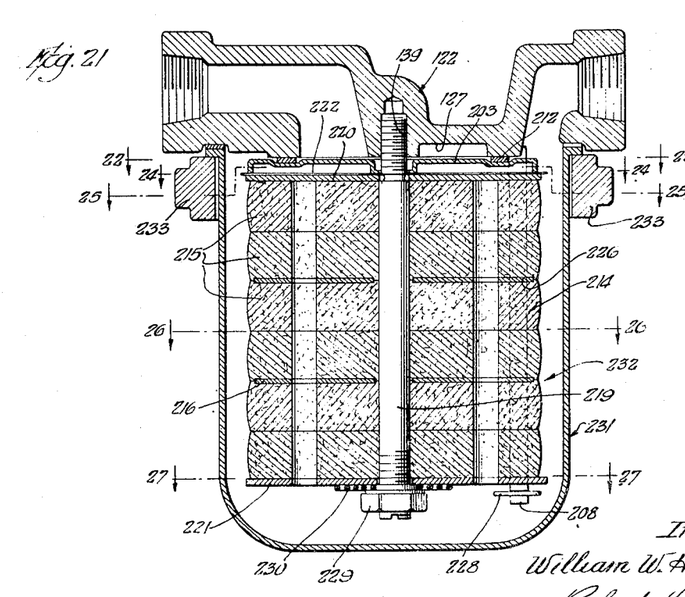
Fig. 21 is an axial sectional view taken on the plane of the line 21—21 of Fig. 20, looking in the direction of the arrows.

Referring to Fig. 21, the filter unit comprises the support which consists of the plate 203 and pins 208 and a plurality of pads 215 of substantially rectangular form, spacer plates 216, and a lower end plate 221. The pads are illustrated in plan in Fig. 26 and they comprise thick felted pads made of any of the materials previously mentioned, but preferably made of cotton felt and provided with the following apertures: The central aperture 218 is adapted to pass the supporting rod 219. This aperture is also found in the top plate 220, the bottom plate 221, and in the filter cloth 222. Two diametrically opposite apertures 223 and 224 are provided in each of these same members 215 and 220—222 to receive the pins 208 of the supporting frame.

Figure 25:
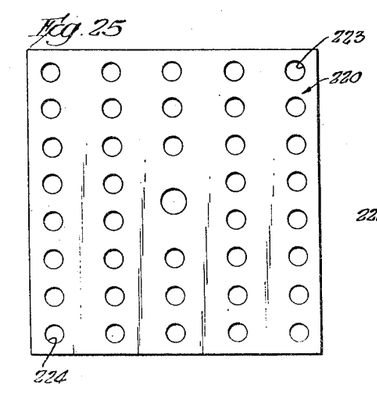
Fig. 25 is a sectional view taken on the plane of the line 25—25 of Fig. 21, looking in the direction of the arrows, showing a plan view of the top plate.
Figure 26:
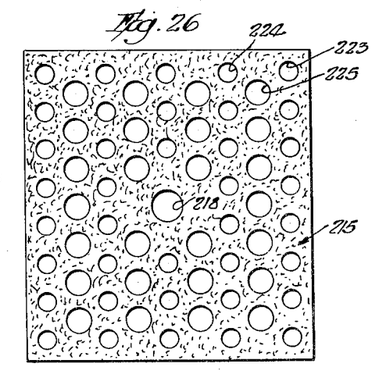
Fig. 26 is a sectional view taken on the plane of the line 26—26 of Fig. 21, looking in the direction of the arrows, showing a plan view of a filter pad or filter element.
Figure 27:
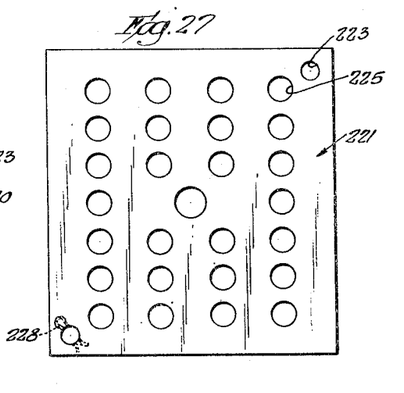
Fig. 27 is a sectional view taken on the plane of line 27—27 of Fig. 21, looking in the direction of the arrows, showing a plan view of the bottom plate.

In addition to this, the felt is provided with a multiplicity of rows of small apertures 224 spaced from each other as shown in the top plate 220, Fig. 25, and the filter pad, Fig. 26, is provided with a multiplicity of larger apertures 225 spaced from each other and located in rows between the smaller apertures and adapted to register with the apertures bearing the same number in the bottom plates 221, Fig. 27.

The filter unit is built up by first placing the filter cloth 222, of closely woven shaker flannel, on the pins 208 against the depending flange 205. Then the top plate 220 of Fig. 25 is put in place, then a pair of pads, and intermediate plates 226 which are apertured like the pads of Fig. 26, may be used between pads.

Each of the pins 208 is preferably provided with an annular groove 227 adjacent its lower end, and the pack is held on the pins 208 by means of a wire spring retainer 228 of the type shown in Fig. 27, which retainer engages bottom plate 221.

Such a unit may be removed in its entirety, being supported by the frame 203, and pins 208. It is held on the body 122 by the center bolt 219 which has its upper end threaded into bore 139 with the plate 203 engaging gasket 212.

At its lower end, bolt 219 has a threaded portion provided with a nut 229 which may compress a conically shaped spiral spring 230 until it is almost flat, to place a predetermined compression on the pads. In this case, as in Fig. 10, the housing 231 is large enough to provide a space 232 between the pads and the housing 231.

The housing of Fig. 21 may be rectangular in the bottom plan, and it has a rectangular frame 233 with sufficient body to be provided with bores for receiving the threaded ends of the screw bolts 234 which pass through the cover 122 into the frame member 233 to clamp the housing 231 on member 122.

Figure 31:
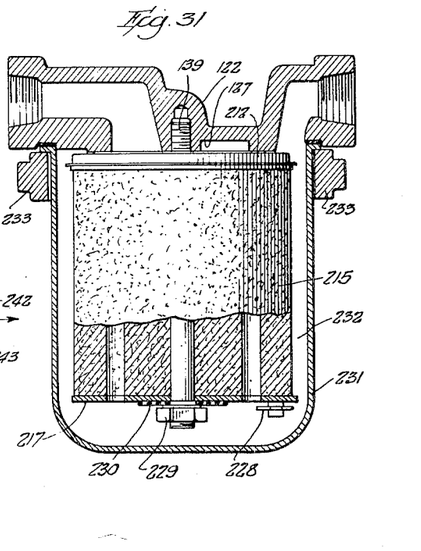
Fig. 31 is a sectional view similar to Fig. 21, of a modification in which a single pad is employed.

Referring now to Fig. 31, this is a modification in which all of the separate felt pad members 215 have been embodied in a single felted assembly provided with the same holes and provided with upper and lower pressure plates.

Figure 32:
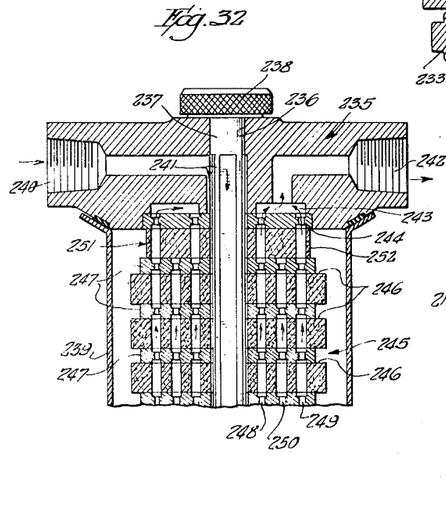
Fig. 32 is a fragmentary sectional view similar to Fig. 21, of a modification which is particularly constructed to by-pass the oil when the filter pads become sufficiently clogged.

Referring now to Fig. 32, this is a fragmentary sectional view taken on a plane passing through the axis of a filter of the type similar to that covered by my prior patent, No. 2,389,431. In this case the filter illustrated differs from my prior patent in that it is provided with an improved structure adapted to permit the by-pass of fluid being filtered whenever the filter pads have become sufficiently clogged.

This filter preferably includes a similar supporting body 235 with a central aperture 236 for supporting a rotatable bolt 237, the head of which, 238, may be turned to secure a housing 239 on the body 235. The inlet to the interior of the housing 239, in this case, is by way of inlet 240 and conduits which extend downwardly through the assembly along the flattened or grooved sides 241 of the supporting post 237. The outlet is by way of conduit 242 which leads from an annular space 243 above the top pressure plate 244.

In this case, the filter unit 245 comprises a plurality of filter pads 246 separated by spacer plates 247, and the filter pads 246 preferably extend beyond the spacer plates to increase the available filtering surface on the outside of the filter unit 245.

Filter pads 246 and spacing plates 247 are provided with a multiplicity of apertures, arranged in circles, these apertures coming into registry or communication when the pads are assembled and forming the filtrate conduits 248 and 249 and the filter surface conduit 250. It will be noted that the former, 248 and 249, communicate with the space 243 and with the outlet, while the latter, 250, is blocked off at the top by upper plate 244, but is adapted to receive liquid to be filtered from the bottom.

The uppermost pad 251 is purposely made smaller in diameter than the pads 246 so that its upper corner 252 comes quite close to the aperture 249 in the upper plate 244.

The operation of this structure is as follows: When the filter pads become sufficiently clogged, the pressure rises in the container 239 and the pressure on the pad at the cylindrical surface of pad 251 is sufficient to cause the corner 252 of this pad to move over and permit the liquid to by-pass the filter and pass out of the aperture 249 in the top pressure plate. Thus there is an automatic by-pass provided by this filter assembly, by having one of the pads so arranged that its edge may be compressed until it uncovers a by-pass opening to the outlet.

It will thus be observed that I have invented a plurality of forms of filter which are adapted to be used in filtering liquids or gases, a number of which are provided with filter units which may be removed or installed as a complete unit. The filter units may be built up to any size by assembling a multiplicity of pads, or they may be made of a single thick felted member which is preformed with the proper apertures and surfaces and is of the size desired.

Some of my filters permit the by-pass of fluid under pressure whenever the filter pads become clogged, thus providing an additional safety feature, and all of them are adapted to permit liquid and gases to pass freely at a minimum pressure while still collecting all of the foreign matter upon the filter surfaces.

The filters are renewed by using new pads which are relatively inexpensive, rather than by attempting to clean the old ones.

The felt pads are equally adapted to by-pass fluid when clogged and subjected to suction, as the differential in pressure will then compress pad 251 to effect a by-pass.

Many of the parts of my filters may be made by stamping and punching operations, so that machining is reduced to a minimum, and the filters may be constructed at a very low cost so that they can be used in many different fields of application where low cost is essential.

The filters are sturdy and capable of being used a long time without the necessity for repair, and they may be cleaned out in regard to sludge, without disturbing the line connections. The filter unit may be replaced without disturbing the line connections.

A much greater filter area is provided in my filter in a minimum amount of space than can be accomplished by any of the other devices of the prior art, at the same cost.

While I have illustrated several embodiments of my invention, many other modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A filter unit comprising a supporting member of substantially circular shape having a longitudinally projecting central lug with a conduit therein, said lug also being formed on the opposite side with a tapered socket of a width adapted to receive a metal plate, a core member comprising an elongated metal member or cruciform cross section having a longitudinally projecting tapered flange to be received in said tapered socket, a plurality of fibrous filter pads having registering central bores adapted to receive said core, said pads being located on said core and said pads having longitudinally extending filter conduits and filtrate conduits located alternately and spaced from each other in a circle, the said pads being provided with opposed shoulders against opposed portions of said cruciform core to determine the relative positions of said pads rotatively of said core, and to assure communication between the filter conduits and filtrate conduits in successive pads.

2. In a filter assembly, the combination of a metal housing having a substantially cylindrical chamber and an annular flange projecting into said chamber, said housing having an outlet above said flange and an inlet below said flange, and a filter unit comprising a metal partition member engaging said flange, resilient means urging said partition against said flange, said partition having a centrally located through conduit and having a depending annular flange, an elongated sheet metal member carried by said partition and located axially thereof, a top filter plate engaging said depending annular flange and forming a filtrate collection chamber, said plate having predetermined through apertures, a filter pad of fibrous material located on said elongated sheet metal member and provided with longitudinally extending apertures registering with the apertures in said plate, said felt pad having access to liquid to be filtered in said chamber at the outer surface of said pad and at a centrally located through bore in said pad, said pad and elongated sheet metal member having engaging shoulders for determining the rotative position of the pad and holding it in registry with the apertures in the top plate, and a bottom plate closing the apertures of the pad which register with the top plate apertures.

3. In a filter assembly, the combination of a metal housing having a substantially cylindrical chamber and an annular flange projecting into said chamber, said housing having an outlet above said flange and an inlet below said flange, and a filter unit comprising a metal partition member engaging said flange, resilient means urging said partition against said flange, said partition having a centrally located through conduit and having a depending annular flange, an elongated sheet metal member carried by said partition and located axially thereof, a top filter plate engaging said depending annular flange and forming a filtrate collection chamber, said plate having predetermined through apertures, a filter pad of fibrous material located on said elongated sheet metal member and provided with longitudinally extending apertures registering with the apertures in said plate, said felt pad having access to liquid to be filtered in said chamber at the outer surface of said pad and at a centrally located through bore in said pad, said pad and elongated sheet metal member having engaging shoulders for determining the rotative position of the pad and holding it in registry with the apertures in the top plate, and a bottom plate closing the apertures of the pad which register with the top plate apertures, resilient means engaging said bottom plate and a cap member carried by said elongated metal plate and engaging said resilient means.

4. A filter unit comprising a supporting member of substantially circular shape having a longitudinally projecting central lug with a conduit therein, said lug also being formed on the opposite side with a tapered socket of a width adapted to receive a metal plate, a core member comprising an elongated metal member of cruciform cross section having a longitudinally projecting tapered flange to be received in said tapered socket, a plurality of fibrous filter pads having registering central bores adapted to receive said core, said pads being located on said core and said pads having longitudinally extending filter conduits and filtrate conduits located alternately and spaced from each other in a circle, the said pads being provided with opposed shoulders against opposed portions of said cruciform core to determine the relative positions of said pads rotatively of said core, and to assure communication between the filter conduits and filtrate conduits in successive pads, the said pads being provided at the end adjacent the supporting member with a metal plate having a central aperture for the core, said plate having apertures for the filtrate conduits but blocking the filter conduits, and said filter unit having at its end, remote from the supporting member, a second plate blocking the filtrate conduits and having an aperture for the core and apertures for the filter conduits.

5. A filter unit comprising a supporting member of substantially circular shape having a longitudinally projecting central lug with a conduit therein, said lug also being formed on the opposite side with a tapered socket of a width adapted to receive a metal plate, a core member comprising an elongated metal member of cruciform cross section having a longitudinally projecting tapered flange to be received in said tapered socket, a plurality of fibrous filter pads having registering central bores adapted to receive said core, said pads being located on said core and said pads having longitudinally extending filter conduits and filtrate conduits located alternately and spaced from each other in a circle, the said pads being provided with opposed shoulders against opposed portions of said cruciform core to determine the relative positions of said pads rotatively of said core, and to assure communication between the filter conduits and filtrate conduits in successive pads, the said pads being provided at the end adjacent the supporting member with a metal plate having a central aperture for the core, said plate having apertures for the filtrate conduits but blocking the filter conduits, and said filter unit having at its end, remote from the supporting member, a second plate blocking the filtrate conduits and having an aperture for the core and apertures for the filter conduits, a compression spring engaging the latter plate, a seating member for the other end of said spring and a pin passing through the core for retaining the seating member in engagement with the spring.

6. A filter unit comprising a supporting member of substantially circular shape having a longitudinally projecting central lug with a conduit therein, said lug also being formed on the opposite side with a tapered socket of a width adapted to receive a metal plate, a core member comprising an elongated metal member of cruciform cross section having a longitudinally projecting tapered flange to be received in said tapered socket, a plurality of fibrous filter pads having registering central bores adapted to receive said core, said pads being located on said core and said pads having longitudinally extending filter conduits and filtrate conduits located alternately and spaced from each other in a circle, the said pads being provided with opposed shoulders against opposed portions of said cruciform core to determine the relative positions of said pads rotatively of said core, and to assure communication between the filter conduits and filtrate conduits in successive pads, the said pads being provided at the end adjacent the supporting member with a metal plate having a central aperture for the core, said plate having apertures for the filtrate conduits but blocking the filter conduits, and said filter unit having at its end, remote from the supporting member, a second plate blocking the filtrate conduits and having an aperture for the core and apertures for the filter conduits, the said supporting member being formed with an annular conduit on the side toward the filter pads and with a discharge conduit connection between said annular conduit and the conduit in said lug.

7. A filter unit comprising a supporting member of substantially circular shape having a longitudinally projecting central lug with a conduit therein, said lug also being formed on the opposite side with a tapered socket of a width adapted to receive a metal plate, a core member comprising an elongated metal member of cruciform cross section having a longitudinally projecting tapered flange to be received in said tapered socket, a plurality of fibrous filter pads having registering central bores adapted to receive said core, said pads being located on said core and said pads having longitudinally extending filter conduits and filtrate conduits located alternately and spaced from each other in a circle, the said pads being provided with opposed shoulders against opposed portions of said cruciform core to determine the relative positions of said pads rotatively of said core, and to assure communication between the filter conduits and filtrate conduits in successive pads, the said pads being provided at the end adjacent the supporting member with a metal plate having a central aperture for the core, said plate having apertures for the filtrate conduits but blocking the filter conduits, and said filter unit having at its end, remote from the supporting member, a second plate blocking the filtrate conduits and having an aperture for the core and apertures for the filter conduits, the said supporting member being formed with an annular conduit on the side toward the filter pads and with a discharge conduit connection between said annular conduit and the conduit in said lug, and a filter cloth interposed between the supporting member and the adjacent plate for catching the fuzz and other small particles which might become detached from the filter pads.

WILLIAM W. HALLINAN.

REFERENCES CITED

The following references are of record in the file of this patent:

UNITED STATES PATENTS

| Number | Name | Date |
|---|---|---|
| 219,931 | Gainey | Sept. 23, 1879 |
| 1,506,967 | Bosworth | Sept. 2, 1924 |
| 2,031,935 | Cuno | Feb. 25, 1936 |
| 2,197,252 | Decker | Apr. 16, 1940 |
| 2,389,431 | Hallinan | Nov. 20, 1945 |